US011574215B2

United States Patent
Zeng et al.

(10) Patent No.: US 11,574,215 B2
(45) Date of Patent: Feb. 7, 2023

(54) EFFICIENCY DRIVEN DATA COLLECTION AND MACHINE LEARNING MODELING RECOMMENDATION

(71) Applicant: KYNDRYL, INC., New York, NY (US)

(72) Inventors: Sai Zeng, Yorktown Heights, NY (US); Braulio Gabriel Dumba, Elmsford, NY (US); Jun Duan, Yorktown Heights, NY (US); Matthew Staffelbach, White Plains, NY (US); Emrah Zarifoglu, San Mateo, CA (US); Umar Mohamed Iyoob, Pflugerville, TX (US); Manish Mahesh Modh, Cedar Park, TX (US)

(73) Assignee: KYNDRYL, INC., New York, NY (US)

( * ) Notice: Subject to any disclaimer, the term of this patent is extended or adjusted under 35 U.S.C. 154(b) by 346 days.

(21) Appl. No.: 16/858,657

(22) Filed: Apr. 26, 2020

(65) Prior Publication Data

US 2021/0334677 A1 Oct. 28, 2021

(51) Int. Cl.
*G06N 5/04* (2006.01)
*G06N 20/00* (2019.01)
*G06Q 40/06* (2012.01)

(52) U.S. Cl.
CPC ............... *G06N 5/04* (2013.01); *G06N 20/00* (2019.01); *G06Q 40/06* (2013.01)

(58) Field of Classification Search
CPC ........... G06N 5/04; G06N 20/00; G06Q 40/06
USPC ...................................... 700/28–55
See application file for complete search history.

(56) References Cited

U.S. PATENT DOCUMENTS

| 8,311,863 | B1 | 11/2012 | Kemp |
| 8,706,548 | B1 | 4/2014 | Blume et al. |
| 2016/0321585 | A1* | 11/2016 | Saraswat .......... G06Q 10/06311 |
| 2016/0350376 | A1* | 12/2016 | Marecek .......... G06F 16/24532 |
| 2019/0163718 | A1* | 5/2019 | Borje .................... G06Q 10/04 |
| 2020/0219004 | A1* | 7/2020 | Daly ..................... G06N 5/045 |
| 2021/0049503 | A1* | 2/2021 | Nourian ................ G06N 7/023 |
| 2021/0158178 | A1* | 5/2021 | Cmielowski .......... G06F 16/906 |
| 2021/0201270 | A1* | 7/2021 | Cross .................... G06K 9/6232 |

(Continued)

OTHER PUBLICATIONS

Aher, Sunita B., and L. M. R. J. Lobo. "Combination of machine learning algorithms for recommendation of courses in E-Learning System based on historical data." Knowledge-Based Systems 51 (2013): pp. 1-14. (Year: 2013).*

(Continued)

*Primary Examiner* — Satish Rampuria
(74) *Attorney, Agent, or Firm* — Intelletek Law Group, PLLC; Gabriel Daniel, Esq.

(57) ABSTRACT

A machine learning assessment system is provided. The system identifies multiple datasets and multiple machine learning (ML) modeling algorithms based on the client profile. The system assesses a cost of data collection for each dataset of the multiple datasets. The system assesses a performance metric for each ML modeling algorithm of the multiple modeling algorithms. The system recommends a dataset from the multiple datasets and an ML modeling algorithm from the multiple ML modeling algorithm based on the assessed costs of data collection for the multiple datasets and the assessed performance metrics for the multiple ML modeling algorithms.

17 Claims, 9 Drawing Sheets

(56) References Cited

U.S. PATENT DOCUMENTS

2021/0256310 A1* 8/2021 Roberts .................. G06N 20/00

OTHER PUBLICATIONS

Galindo, Jorge, and Pablo Tamayo. "Credit risk assessment using statistical and machine learning: basic methodology and risk modeling applications." Computational economics 15.1 (2000): pp. 107-143. (Year: 2000).*

Nguyen, Thuy TT, and Grenville Armitage. "A survey of techniques for internet traffic classification using machine learning." IEEE communications surveys & tutorials 10.4 (2008): pp. 56-76. (Year: 2008).*

Li, Tian, et al. "Federated learning: Challenges, methods, and future directions." IEEE Signal Processing Magazine 37.3 (2020): pp. 50-60. (Year: 2020).*

Fatima, Iram, et al. "Prediction of postpartum depression using machine learning techniques from social media text." Expert Systems 36.4 (2019): pp. 1-13. (Year: 2019).*

Pearson, Siani. "Trusted agents that enhance user privacy by self-profiling." AAMAS. vol. 2. 2002.pp. 1-12 (Year: 2002).*

Mell, P. et al., "Recommendations of the National Institute of Standards and Technology"; NIST Special Publication 800-145 (2011); 7 pgs.

Hanke, N. et al., "The Age of Analytics: Competing in a Data-Driven World"; McKinsey & Company, McKinsey Global Institute (2016); 5 pgs.

Anonymous, "Business Impacts of Machine Learning"; Deloitte Access Economics Pty Ltd. (2017); 40 pgs.

Anonymous, "Systematic Derivation of Strategic Systematic Derivation of Strategic Recommendations for Process Improvements that will Yield an Optimized ROI by Using Machine Learning, Design Thinking, Process Taxonomy, Pareto an Five Why Analysis"; IP.Com (2018); 6 pgs.

Xu, J. et al., "A Method and System for Evaluating Effectiveness of a Demand Side Platform"; IP.Com (2014); 8 pgs.

Rodriguez, J.A.D. et al., "Method and System for Campaign Optimization and Bid Management in Online Advertising"; IP.Com (2011); 5 pgs.

* cited by examiner

| Data Collection Mechanism | Profile (e.g., type of data collected) | Cost of Data Collection |
|---|---|---|
| 301 → Collection Mechanism 1 (ALDM) | User behavior<br>User login and thermal activity<br>VM dependency discovery<br>Network connections<br>Configuration files<br>Log files… | High licensing cost<br>Hard to deploy to every endpoint<br>Intrusive to IT infrastructure<br>High impact on running workloads<br>Has Data privacy<br>No dependency on tools |
| 302 → Collection Mechanism 2 (Script run on server or VMs) | Resource Utilization<br>VM utilization<br>CPU/Mem utilization of significant process<br>Login Activities<br>Extract both login frequency and duration<br>Differentiate daytime and nighttime logins… | Medium licensing cost<br>Hard to deploy to every endpoint<br>Intrusive to IT infrastructure<br>Low impact on running workloads<br>Has Data privacy<br>No dependency on tools |
| 303 → Collection Mechanism 3 (Script run on mgmt server) | Resource Utilization<br>VM utilization | Low licensing cost<br>Easy to deploy, need hypervisor<br>Not intrusive to IT infrastructure<br>No impact on running workloads<br>May have data privacy<br>No dependency on tools |

*FIG. 3a*

| ML Modeling Algorithm | Performance Metric | Efficiency Metric | Associated Data Collection Mechanism |
|---|---|---|---|
| Reference Mining Decision Tree to Identify Servers | Precision: 0.89<br>Recall: 100<br>350 idle servers identified<br>0 idle servers missed | 35% accurately identified,<br>0% missed,<br>13.7% misclassified as idle<br>Potentially realized yearly savings is 1.84M,<br>missed savings is 1.26M | ALDM<br><br>301 |
| Primitive Information + SVM Classifier + Network affinity Analysis | Precision: 0.81<br>Recall: 90<br>184 idle servers identified<br>126 idle servers missed | 18.4% accurately identified,<br>12.6% missed,<br>8.7% misclassified as idle<br>Potentially realized yearly savings is 1.84M,<br>missed savings is 1.26M | Script run on server or VMs<br><br>302 |
| Resource Utilization, e.g., VM utilization | Precision: 0.78<br>Recall: 0.70<br>102 idle servers identified<br>224 idle servers missed | 10.2% accurately identified,<br>22.4% missed,<br>14.9 % misclassified as idle<br>Potentially realized yearly savings is 1.02M,<br>missed savings is 2.24M | Script run on mgmt server<br><br>303 |

311 → (row 1)
312 → (row 2)
313 → (row 3)

EFFICIENCY DRIVEN DATA COLLECTION AND MACHINE LEARNING MODELING RECOMMENDATION

BACKGROUND

Technical Field

The present disclosure generally relates to data collection and machine learning.

Description of the Related Arts

Machine learning (ML) is the use of algorithm and statistical models that can be used by, computer systems to perform a specific task without using explicit instructions, relying on patterns and inference instead. Machine learning algorithms build a mathematical model based on sample data, known as "training data", in order to make predictions or decisions without being explicitly programmed to perform the task. Machine learning algorithms are used in a wide variety of applications, where it is difficult or infeasible to develop a conventional algorithm for effectively, performing the task.

SUMMARY

Some embodiments of the disclosure provide a machine learning assessment system. The system identifies multiple datasets and multiple machine learning (ML) modeling algorithms based on the client profile. The system assesses a cost of data collection for each dataset of the multiple datasets. The system assesses a performance metric for each ML modeling algorithm of the multiple modeling algorithms. The system recommends a dataset from the multiple datasets and an ML modeling algorithm from the multiple ML modeling algorithm based on the assessed costs of data collection for the multiple datasets and the assessed performance metrics for the multiple ML modeling algorithms.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Machine Learning (ML) such as supervised learning involves training data as input. Acquisition of data with good information coverage, sufficient volume, high quality is a challenging task. The data available impacts the selection and/or training of ML algorithms, and the output accuracy directly impacts on client value. Data scientists typically build ML models based on the dataset given and focus on achieving the best model performance by exploring or augmenting various algorithms, rather than trying to obtain better dataset to improve algorithm performance. A good dataset with proven result may be available for one client, but that good result cannot be replicated for other clients. A client can only do what is possible based on the available data and nothing else.

Some embodiments of the disclosure provide a system that assesses training data of ML models. The system profiles existing datasets (e.g., entirety, subsets, etc.) and corresponding ML model performances as a reference library. The system assesses the cost of data acquisition options based on client characteristics. The system assesses the ML model performances. The system quantifies the ML model performances based on client characteristics. The system also assesses the resource allocation efficiencies (or RAEs) of data collection options and makes recommendations to the clients. RAE rating may refer to efficiencies of computing and network resources allocations, but may also refer to efficiencies of monetary investments such as ROIs (Return on Investment).

Data collection and ML model performance have direct impact on result of the ML solution. The system helps a client to make educated decision on the choice of an existing dataset for the best of ML performance. The system also helps the client to make educated decision on the selection of new datasets for the best of RAE ratings of using AI.

Figure 1:
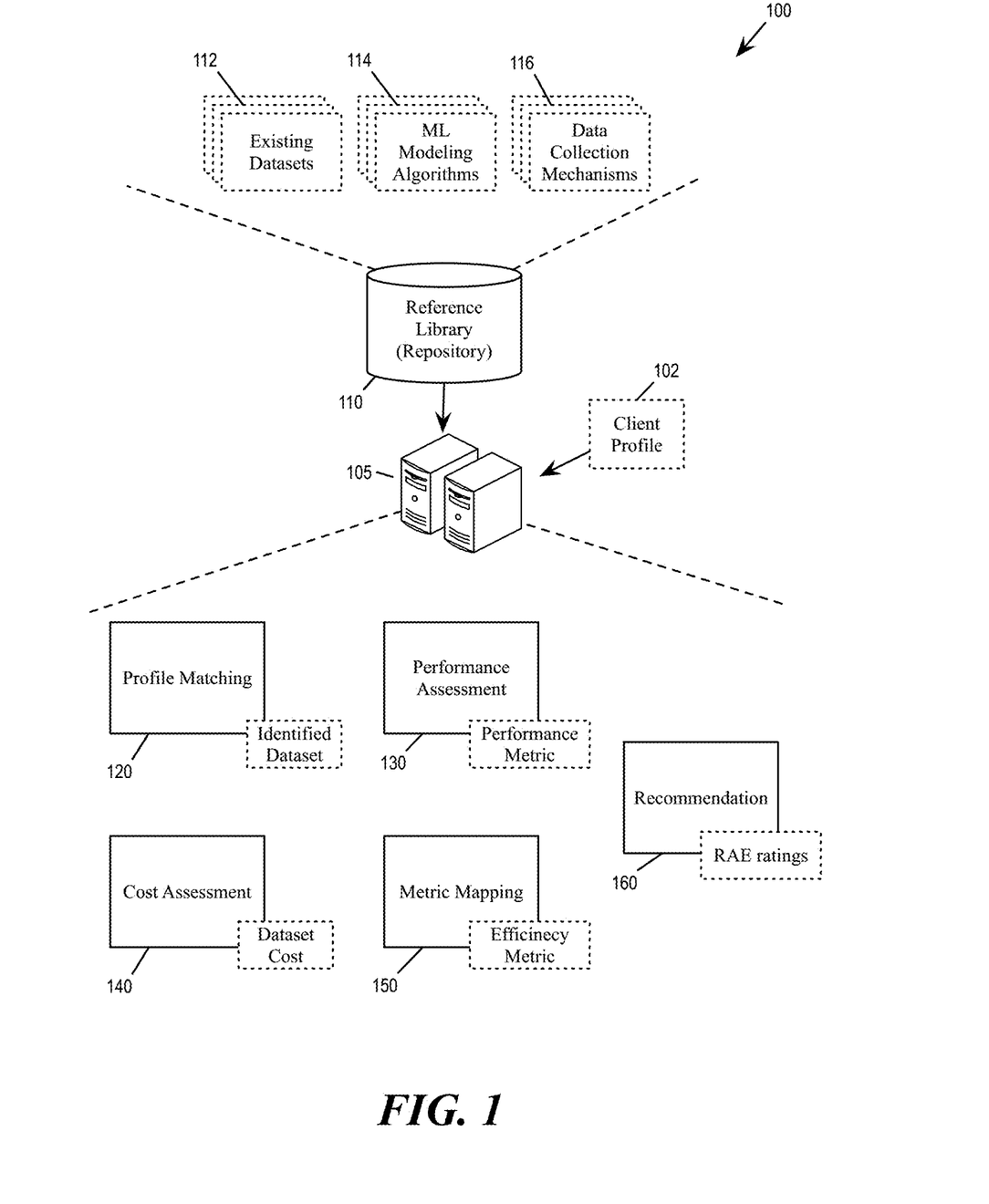
FIG. 1 conceptually illustrates an ML assessment system that makes recommendations of ML models and training data.

FIG. 1 conceptually illustrates an ML assessment system 100 that makes recommendations of ML models and training data. The ML assessment system 100 makes the recommendation by profiling existing datasets, comparing costs of different data collection options or mechanisms, assessing the performance of different ML models, and recommending an ML solution based on RAE ratings that are determined from efficiency metrics and performance metrics.

The ML assessment system 100 receives a client profile 102, which includes information such as client's architectural requirement, type of business, etc., that the ML assessment system 100 uses to identify the most suitable ML model and training dataset for the client. As illustrated, one or more computing devices 105 implement the ML assessment system 100 by implementing a reference library (or repository) 110, a profile matching module 120, a performance assessment module 130, a cost assessment module 140, a metric mapping module 150, and a recommendation module 160.

In some embodiments, the modules 110-160 are modules of software instructions being executed by one or more processing units (e.g., a processor) of the computing device(s) 105. In some embodiments, the modules 110-160 are modules of hardware circuits implemented by one or more integrated circuits (ICs) of an electronic apparatus. Though the modules 110, 120, 130, 140, 150, and 160 are illustrated as being separate modules, some of the modules can be combined into a single module. In some embodiments, at least part of the data content of the reference library 110 is stored in an external storage device in a cloud environment. In some embodiments, at least part of the data content of the reference library 110 is stored in a storage device internal to the computing device(s) 105. An example computing device 600 that may implement the computing device 105 will be described by reference to FIG. 6 below.

The reference library 110 is a repository for datasets and ML models. As illustrated, the reference library stores existing datasets 112, ML models 114, and data collection mechanisms 116, and/or information or profiles of the existing datasets 112, the ML modeling algorithms 114, and the data collection mechanisms 116.

Each of the existing datasets 112 may include data that has been used previously to train a ML model under a ML algorithm. The information or profile of an existing dataset may include indications of the types of the data that are included in the existing dataset, or the sources of the data that are include in the existing dataset, or a description of how and the dataset was generated. For example, the information or profile of an existing dataset may indicate the endpoints in a network from which the existing dataset is collected.

Each of the ML modeling algorithms 114 may include an algorithm or data structure (e.g., a particular type of neural network) that is used to generate an ML model when trained by one of the existing datasets 112. In some embodiments, the reference library 110 stores identifiers or links of the ML modeling algorithm 114. The information or profile of an ML model stored in the reference library 110 may include performance metrics associated with a specific existing dataset (e.g., one of the existing the datasets 112) or data generated by a specific data collection mechanism (e.g., one of the data collection mechanisms 116.)

Each of the data collection mechanisms 116 may document how to obtain or generate a dataset. Such a documentation may specify the types of the data that are included in the existing dataset, or the sources (e.g., network endpoints) from which data samples are obtained. The information or profile of a data collection mechanism may include an estimate of the cost of using the data collection mechanism to generate a dataset, or a formula or algorithm for determining the cost of using the data collection mechanism to generate a dataset. The cost of a data collection mechanism may include resource estimates, or work hour estimates, or a list of cost incurring factors associated with using the data collection mechanism.

The profile matching module 120 receives the client profile 102 and identifies multiple datasets and multiple machine learning (ML) modeling algorithms based on the client profile 102. The performance assessment module 130 assesses a performance metric for each ML modeling algorithm 114. The cost assessment module 140 assesses a cost of data collection for each dataset 112 or data collection mechanism 116. The metric mapping module 150 maps the assessed performance metrics to efficiency metrics. The recommendation module 160 recommends a dataset from the datasets 112 and the ML modeling algorithms 114 by determining a RAE rating based on the assessed costs of data collection and the assessed performance metrics.

Figure 2:
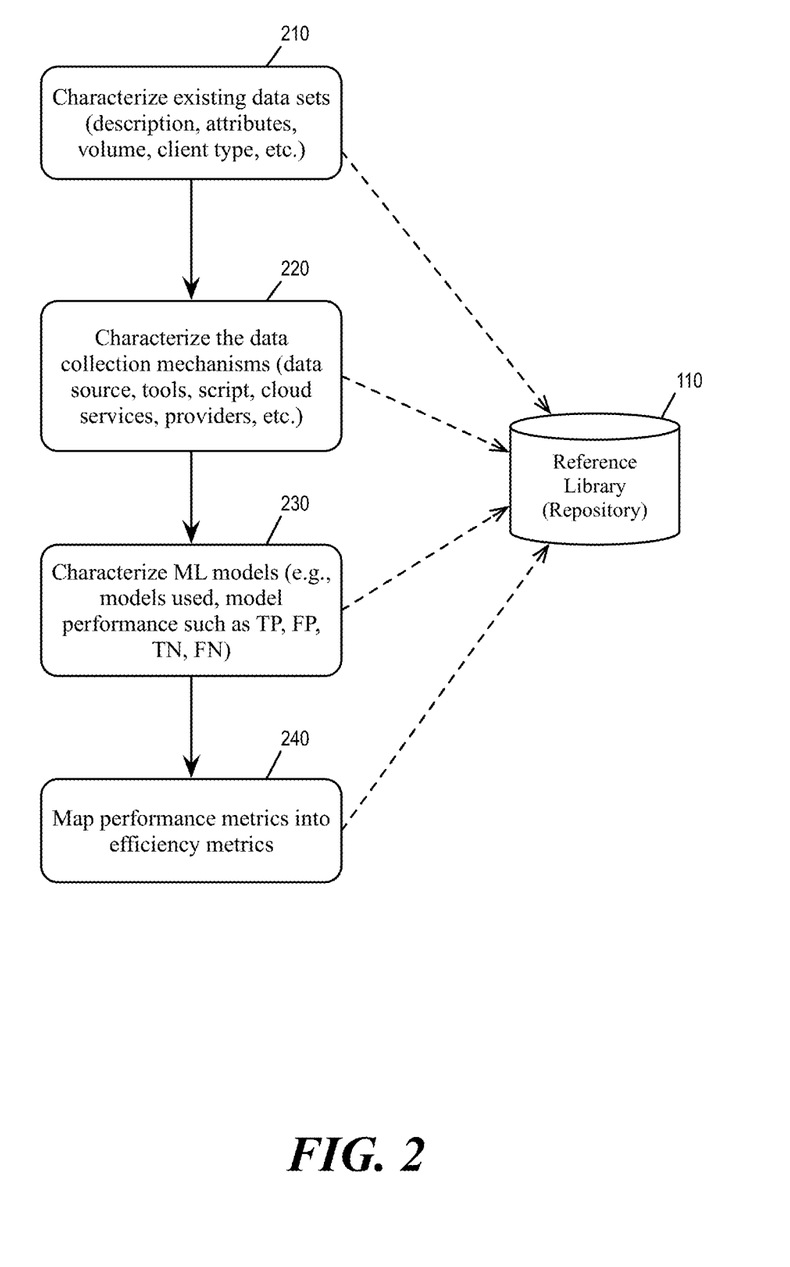
FIG. 2 conceptually illustrates the generation of the content of the reference library.

FIG. 2 conceptually illustrates the generation of the content of the reference library 110. At block 210, existing datasets stored in the reference library 110 (e.g., datasets 112) are characterized or profiled. The profile of an existing dataset may include information such as description, attributes, volumes, client types, etc. The generated profiles of the datasets are stored in the reference library 110.

At block 220, data collection mechanisms stored in the reference library are characterized or profiled. In some embodiments, the profiles are generated by users and/or clients and provided to the ML assessment system. In some embodiments, the ML assessment system perform natural language processing on information related to the data collection mechanisms in order to generate the profiles. The profile of a data collection mechanism may include information such as data source, tools, script, cloud service, providers. The profile of a data collection mechanism may be used to determine the costs associated with using the data collection mechanism. The generated profiles of the data collection mechanism are stored in the reference library 110.

At block 230, ML modeling algorithms are characterized or profiled. In some embodiments, the profiles are generated by users and/or vendors and provided to the ML assessment system. In some embodiments, the ML assessment system perform natural language processing on information related to the ML modeling algorithms in order to generate the profiles. In some embodiments, the ML assessment system generates the profiles of the ML modeling algorithms by analyzing their historical performance metrics. The profile of an ML modeling algorithm may identify the models used, as well as the performance metrics of the model, such as statistics of true positive (TP), false positive (FP), true negative (TN), false negative (FN). For example, the performance metric may be derived from statistics that states that "26 cloud instances are identified as productive, and of the remaining, 7 are identified as high-confidence unproductive cloud instances with only 6 correct and 18 medium-confidence unproductive cloud instances with 12 correct". The generated profiles of the ML modeling algorithms are stored in the reference library 110.

At block 240, performance metrics of different ML modeling algorithms are mapped into efficiency metrics that can be used to predict the RAE ratings of using those ML modeling algorithms. For example, in some embodiments, performance metrics such as TP, FP, TN, and FN are mapped to efficiency metrics such as percentages of correct detection and false detection, or corresponding return on investment (e.g., monetary savings from correct detection relative to monetary investment of having to perform the detection operations.) The efficiency metrics are stored in the reference library 110.

Figure 3A:
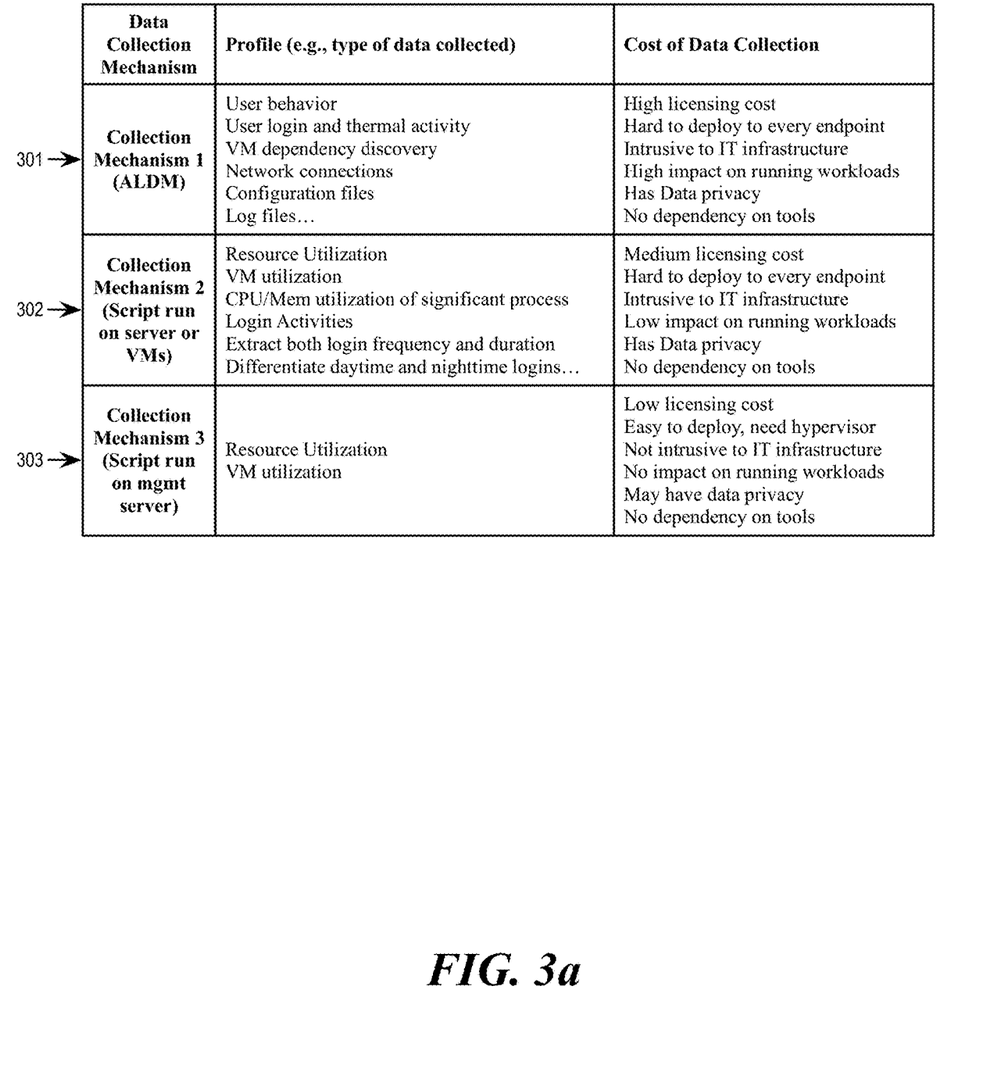
FIGS. 3a-b conceptually illustrate content of the reference library for the ML assessment system, consistent with an exemplary embodiment.
Figure 3B:
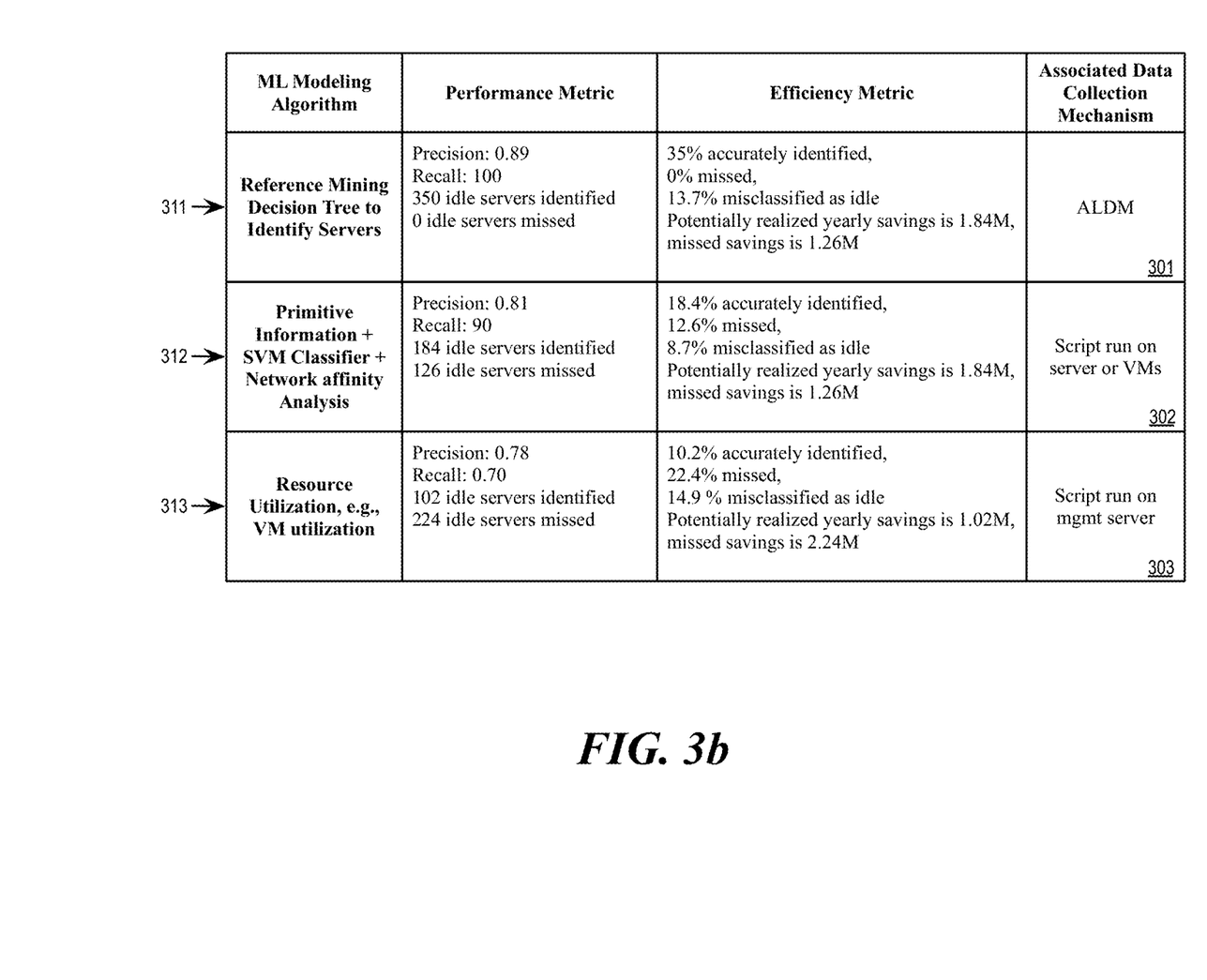

FIGS. 3a-b conceptually illustrate content of the reference library 110 for the ML assessment system 100, consistent with an exemplary embodiment. The content of the reference library 110 includes information regarding various ML modeling algorithms and data collection mechanisms. In the example, the ML assessment system 100 is used for analyzing a datacenter to identify zombie servers that draw power but do not perform any function. For each data collection mechanism, the reference library 110 stores corresponding cost items. For each ML modeling algorithm, the reference library 110 stores a performance metric, which can be translated into resource efficiency metrics.

FIG. 3a illustrates example content of a portion of the reference library 110 that stores information regarding data collection mechanisms for generating datasets. Specifically, the reference library 110 stores the profiles and the costs of three example data collection mechanisms 301, 302, and 303. The data collection mechanism 301 is based on Application Lightweight Discovery Management, or ALDM, which is run on individual servers or virtual machines. The data collection mechanisms 302 is based on a first script that runs on individual servers or virtual machines (VMs). The data collection mechanism 303 is based on a second script that runs on Information Technology (IT) management servers.

The profiles of the data collection mechanisms 301-303 list their corresponding properties. In some embodiments, the ML assessment system 100 uses the content of the profiles to identify a most suitable dataset or data collection mechanism for a client by correlating the client's requirement with the content of the profiles. In the example of FIG. 3a, the profile of the data collection mechanism 301 describes the types of data being collected to include "user behavior", "user login and thermal activity", "VM dependency discovery", "network connections", etc., while the profile of the data collection mechanism 302 describes the types of data being collected to include "resource utilization", "VM utilization", "CPU/Memory utilization of significant process", "login activities", etc.

The costs of the data collection mechanisms 301-303 are listed as cost items. In the example of FIG. 3a, the cost items of the data collection mechanism 301 include factors such as "high licensing cost", "hard to deploy to every endpoint", "intrusive to IT infrastructure", "high impact on running workloads", etc., while the cost items of the data collection mechanism 302 include factors such as "medium licensing cost", "hard to deploy to every endpoint", "intrusive to IT infrastructure", "low impact on running workloads", etc. The cost items of a data collection mechanism are factors that contribute to the cost of employing the data collection mechanism. In some embodiments, the ML assessment system 100 evaluates (at the cost assessment module 140) these cost items qualitatively when determining whether the data collection mechanism is suitable for a client's business requirements. In some embodiments, the ML assessment system 100 evaluates some or all of the cost items quantitatively by e.g., mapping the cost items to actual dollar amounts.

FIG. 3b illustrates example content of a portion of the reference library 110 that stores information regarding ML modeling algorithms. Specifically, the reference library 110 stores the performance metrics and efficiency metrics of three example ML modeling algorithms 311, 312, and 313. The ML modeling algorithm 311 uses reference mining decision tree to identify servers. The ML modeling algorithm 312 uses primitive information and SVM classifier and network affinity analysis. The ML modeling algorithm 313 uses resource utilization such as VM utilization.

The performance metrics of the modeling algorithms 311-313 include various raw statistics for each of the algorithms. The ML assessment system 100 may receive these performance statistics from an administrator or user. The ML assessment system 100 may also determine those performance statistics by analyzing or executing the ML modeling algorithms 311-313. In the example of FIG. 3b, the reference library 110 stores the quantitative values of performance metrics for each of the ML modeling algorithms, performance metrics such as "precision", "recall", "number of idle servers identified", and "number of idle servers missed". Based on these performance metrics, the ML assessment system 100 may determine a set of efficiency metrics for each of the modeling algorithms 311-313 and/or to select a most suitable ML modeling algorithm.

The efficiency metrics of the modeling algorithms 311-313 include statistics that are mapped or scaled from the performance metrics to be directly relevant to the requirement of a particular client. In the example of FIG. 3b, for each modeling algorithm, these statistics include percentages of servers that are accurately identified as idle, of servers that are idle but not identified, and of servers that are not idle but mis-identified as idle. The efficiency metrics also include monetary projections or RAE ratings related to each of modeling algorithms 311-313. In the example of FIG. 3b, for each modeling algorithm, these monetary projections include potentially realized yearly savings and missed savings. The ML assessment system uses these efficiency metrics and performance metrics to identify the most suitable algorithm and the most suitable training data (or data collection mechanism thereof) for a client, based on the client's profile.

In some embodiments, the reference library 110 associates each ML modeling algorithm with a data collection mechanism. In the example of FIG. 3b, the algorithm 311 is associated with data collection mechanism 301 (ALDM), the algorithm 312 is associated with data collection mechanism 302 (script run on individual servers), and the algorithm 313 is associated with data collection mechanism 303 (script run on IT management servers). In some embodiments, the data collection mechanism associated with an ML modeling algorithm is the data collection mechanism that is used to generate the training data that results in the performance metrics of the ML modeling algorithm stored in the reference library 110.

Figure 4:
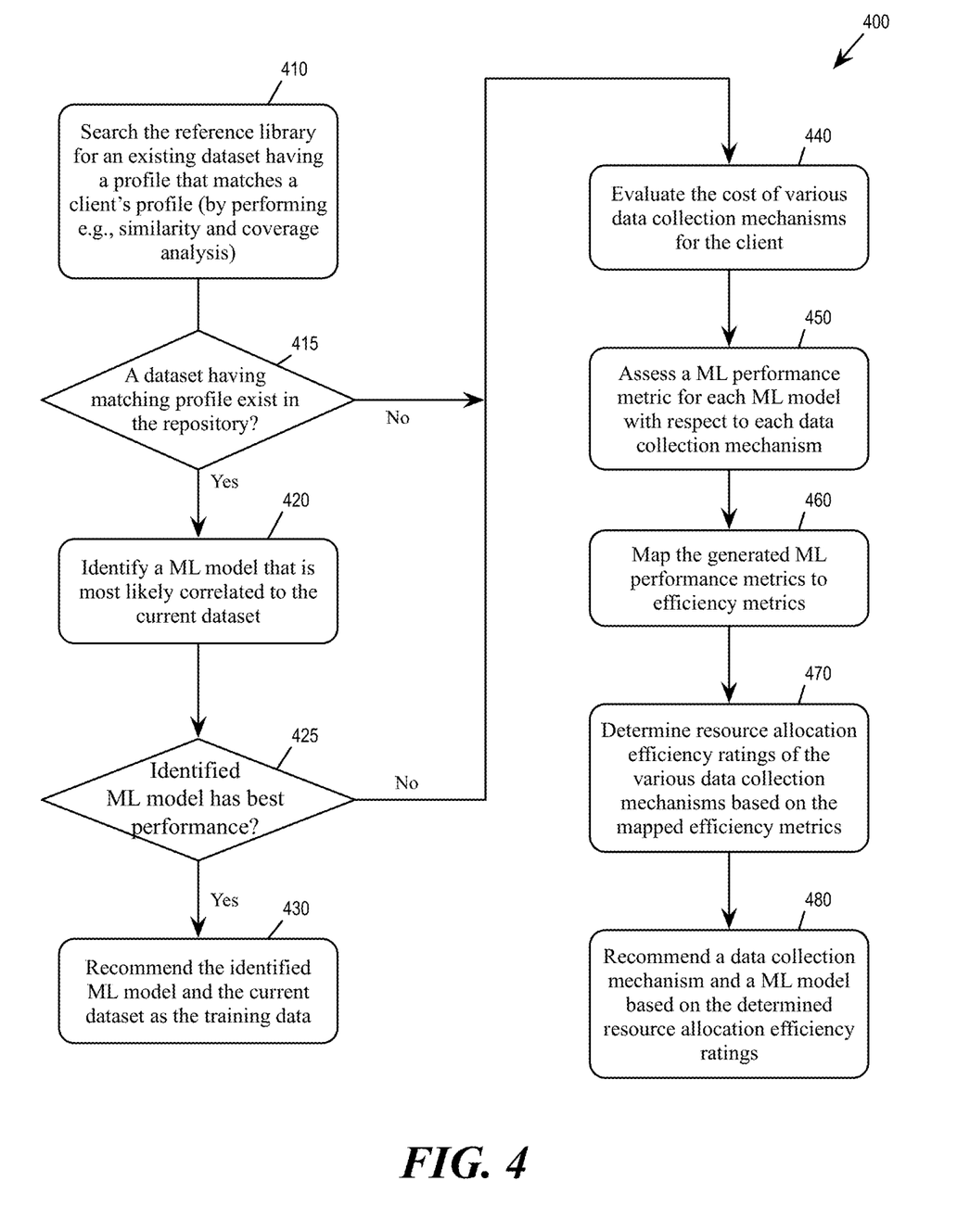
FIG. 4 conceptually illustrates an example process for using the content of the reference library to recommend an ML modeling algorithm and/or a data collection mechanism.

FIG. 4 conceptually illustrates an example process 400 for using the content of the reference library to recommend an ML modeling algorithm and/or a data collection mechanism. The system searches (at block 410) the reference library for an existing dataset having a profile that matches a client's profile. In some embodiments, the system performs similarity and/or coverage analysis between a client's profile and the profiles of existing datasets in the reference library. For example, if the client's profile indicates that the client's network has easy access to resource utilization data, or that client's application emphasizes VM utilization, the system may identify an existing dataset that is generated by the data collection mechanism 302, provided that sufficient portions of the client's profile match the profile of the existing dataset (e.g., having a correlation score that is higher than a threshold.) If a dataset having a matching profile exists in the reference library, the process proceeds to block 420, with the existing dataset having the matching profile being used as a current dataset. If no dataset having a matching profile exists in the reference library, the process proceeds to block 440.

The system identifies (at block 420) one or more ML modeling algorithm that is most likely correlated to the current dataset. In some embodiments, the system identifies the most likely correlated ML modeling algorithm to the current dataset by comparing the profile of the current dataset with profiles of the ML modeling algorithms in the reference library. In some embodiments, the system identifies the most likely correlated ML modeling algorithm to the current dataset by identifying which ML modeling algorithm is historically known to have worked well with datasets having profiles similar to the current dataset. In some embodiments, the reference library stores indications linking datasets with ML modeling algorithms such that the system 100 may follow the link to identify the most likely correlated ML modeling algorithm.

The system determines (at block 425) whether the identified ML modeling algorithm has the best performance among the ML modeling algorithms in the reference library. In some embodiments, the system compares the known performance metrics of the most likely correlated ML modeling algorithm identified at block 420 with the known performance metrics of the other ML modeling algorithm. In some embodiments, the system performs execution or analysis of at least some of the ML modeling algorithms in the reference library to determine whether any is likely to have a better performance than the identified most likely correlated ML modeling algorithm. In some embodiments, rather than determining whether the identified most likely correlated algorithm has the best performance, the system simply determines whether the identified most likely correlated ML modeling algorithm has performance metrics that is sufficient for the client's requirement. If the identified ML does have the best performance, the process proceeds to block 430. Otherwise, the process proceeds to block 440.

At block 430, the system recommends the identified ML modeling algorithm and the current dataset as the training data. At this stage of the process 400, the ML assessment system has determined that there is an existing dataset in the reference library having a profile that matches the requirement or profile of the client, and that the current dataset has a corresponding ML modeling algorithm that has the best performance or sufficient performance for the client.

As mentioned above, if none of the datasets in the reference library has a profile that matches the client's profile, or if the identified ML modeling algorithm does not have the best performance, the process proceeds to block 440. At block 440, the system evaluates the costs of various data collection mechanisms for the client. For each data collection mechanism, the system may identify the factors that contribute to the cost of collecting data using the data collection mechanism. The system may estimate the client's cost of using the data collection mechanism based on the cost items associated with the data collection mechanism stored in the reference library. The system may qualitatively qualify or disqualify a data collection mechanism based an analysis of cost items in view of the client's profile. The system may quantitatively assign a monetary value to each cost item and scaling the monetary values to the profile of the client.

The system assesses (at block 450) an ML performance metric for each ML modeling algorithm with respect to each data collection mechanism. The system may use historical ML performance metrics with respect to each ML modeling algorithm, which may be stored in the reference library. The system may use the performance metrics of various ML modeling algorithms that were computed at block 420 for determining whether the identified most likely correlating ML model has the best performance. The system may analyze or execute the ML modeling algorithms in the reference library to determine their performance metrics.

The system maps (at block 460) the generated ML performance metrics to efficiency metrics. For example, based on FIG. 3b, the system may map performance metrics such as precision, recall, number of idle servers identified or missed to efficiency metrics such as percentages of accurately identified idle servers, non-idle servers that are misidentified as idle, and idle servers that are misidentified as non-idle. The mapping may be based on client profile such as the architecture or specific requirement of the client, such as the number of network nodes or VMs deployed.

The system determines (at block 470) RAE ratings of the various data collection mechanisms based on the mapped efficiency metric. In some embodiments, the RAE ratings are expressed in monetary terms (e.g., ROI), and the efficiency metrics calculated at block 460 are used to compute ROIs. For example, based on FIG. 3b, the system may map efficiency metrics such as percentages of accurately identified idle servers, non-idle servers that are misidentified as idle, and idle servers that are misidentified as non-idle into monetary ROIs such as potentially realized yearly saving and missed savings.

The system recommends (at block 480) a data collection mechanism and an ML model based on the determined RAE ratings. The system may select the ML modeling algorithm and the data collection mechanism that would lead to the largest RAE. The system also makes its recommendation based on the costs of the various data collection mechanisms considered. For example, the system may select a particular data collection mechanism because its cost is lower than other data collection mechanisms. The system may also reject a particular data collection mechanism because it has a cost item that is infeasible or prohibitive for the client (based on the client's profile.)

Figure 5:
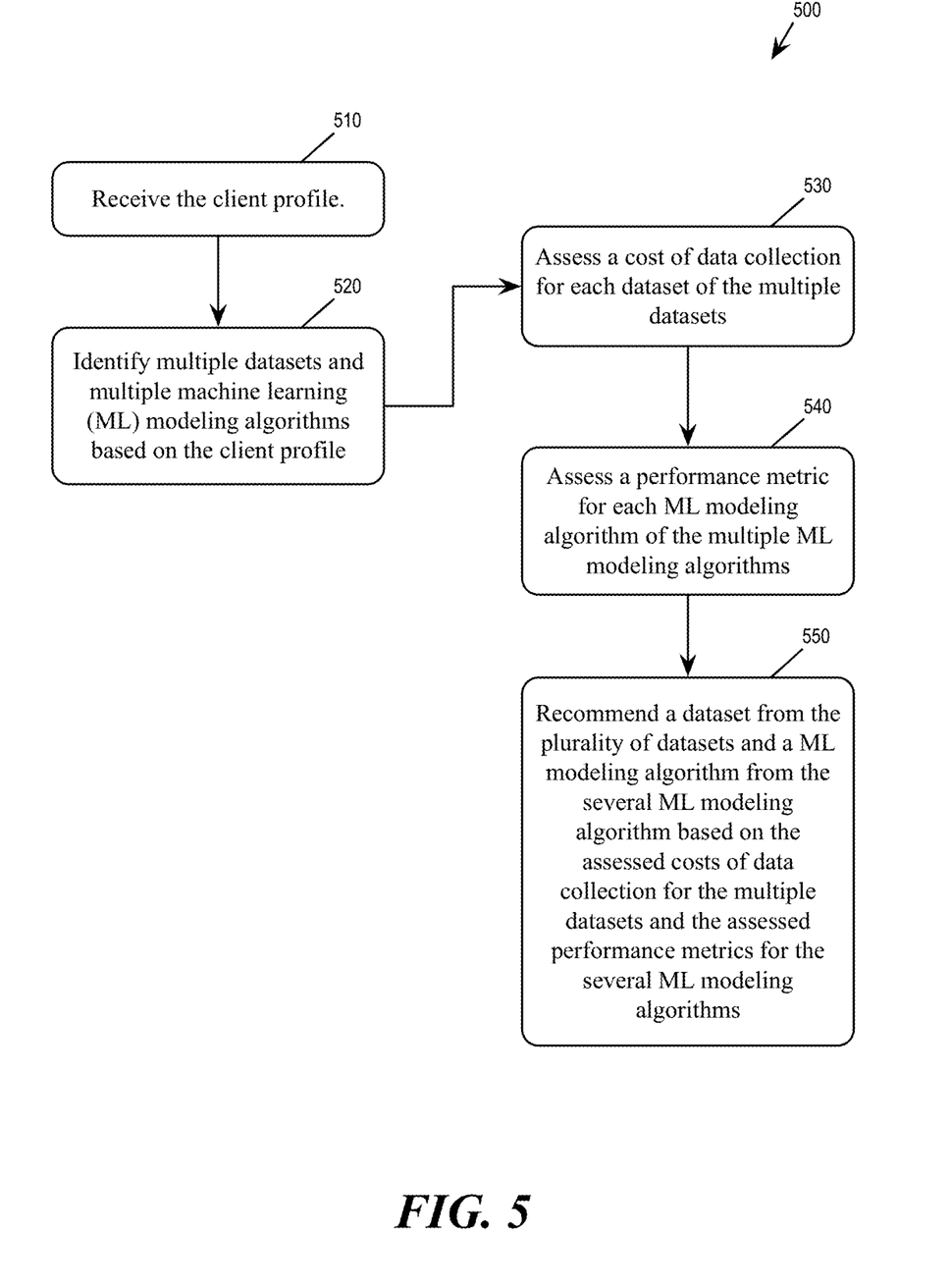
FIG. 5 conceptually illustrates a process for making recommendations of ML models and training data based on a client profile, consistent with an exemplary embodiment.

FIG. 5 conceptually illustrates a process 500 for making recommendations of ML models and training data based on a client profile, consistent with an exemplary embodiment. In some embodiments, one or more processing units (e.g., processor) of a computing device implementing the ML assessment system 100 performs the process 500 by executing instructions stored in a computer readable medium.

The system receives (at block 510) the client profile. The system identifies (at block 520) multiple datasets and multiple machine learning (ML) modeling algorithms based on the client profile. In some embodiments, a reference library stores profiles of the multiple of datasets and ML modeling algorithms, and the system identifies the multiple datasets based on the client profile by assessing the similarity between the profiles of the datasets stored in the reference library and the profile of the client.

The system assesses (at block 530) a cost of data collection for each dataset of the multiple datasets. The system also assesses (at block 540) a performance metric for each ML modeling algorithm of the multiple ML modeling algorithms. In some embodiments, the system assesses the performance metric of an ML modeling algorithm based on a dataset that is identified by the reference library as being associated with the ML modeling algorithm.

The system recommends (at block 550) a dataset from the multiple datasets and an ML modeling algorithm from the multiple ML modeling algorithm based on the assessed costs of data collection for the multiple datasets and the assessed performance metrics for the multiple ML modeling algorithms. In some embodiments, the system recommends the dataset by determining a resource allocation efficiency (RAE) rating based on the assessed cost of the data collection of the recommended dataset and the assessed performance metric of the recommended ML modeling algorithm. The system may assess the costs of data collection for the multiple datasets and the performance metrics for the multiple ML modeling algorithms by accessing the reference library, which may store the costs of data collection and the performance metrics. The RAE rating may be computed based on an efficiency metric that is mapped from the performance metric of the recommended ML modeling algorithm according to the client profile (e.g., by scaling to client's requirement and/or by eliminating datasets and ML models that are too costly for the client.) In some embodiments, the system identifies the ML modeling algorithm to recommend by comparing RAE ratings of different ML modeling algorithms stored in the reference library and identifying the ML modeling algorithm having the highest RAE rating. In some embodiments, the system recommends the dataset based on information stored in the reference library by performing the operations in the process 400.

By matching profiles of the client with profiles of datasets and ML models that are stored in a reference library, the ML assessing system 100 is able to identify the most suitable ML model and dataset as training data for the client from a potentially very large pool of candidate ML solutions. Furthermore, the ML system makes this identification by comparing RAE ratings of different candidate solutions for the client, ensuring that the ML model and training dataset recommended to the client is optimized for client's requirements by improving efficiency and accuracy of the computing device performing the calculations.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIGS. 2-5) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
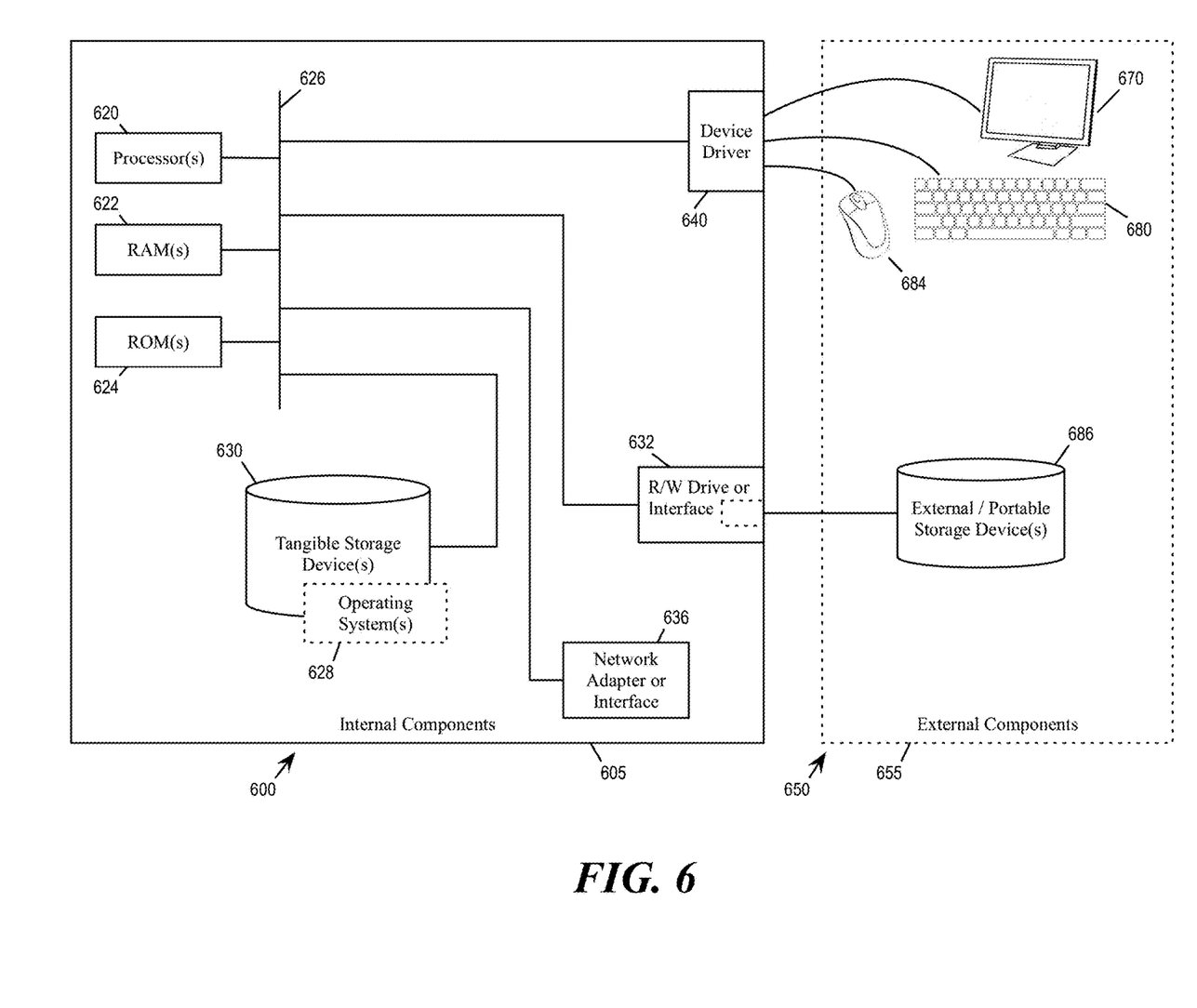
FIG. 6 shows a block diagram of the components of a data processing system in accordance with an illustrative embodiment of the present disclosure.

FIG. 6 shows a block diagram of the components of data processing systems 600 and 650 that may be used to implement a system that makes recommendations of ML models and training data (i.e., the ML assessment system 100) in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 605 and a set of external components 655 illustrated in FIG. 6. The set of internal components 605 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the processes 200, 400, and 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 605 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the processes 200, 400, and 500 can be stored on one or more of the respective portable computer-readable tangible storage devices 686, read via the respective R/W drive or interface 632 and loaded into the respective hard drive 630.

The set of internal components 605 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 655 can include a computer display monitor 670, a keyboard 680, and a computer mouse 684. The set of external components 655 can also include touch screens, virtual keyboards, touch pads, pointing devices, and other human interface devices. The set of internal components 605 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 7:
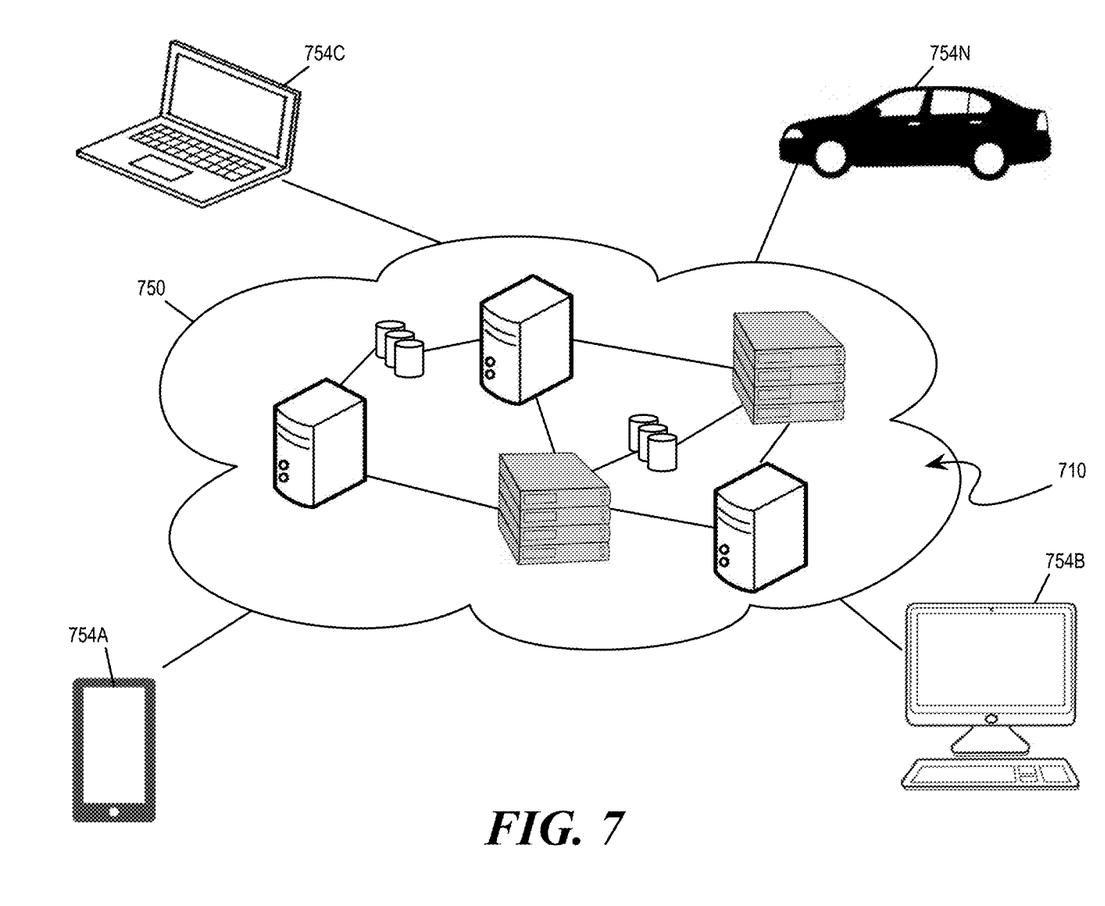
FIG. 7 illustrates an example cloud-computing environment.

Referring now to FIG. 7, an illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
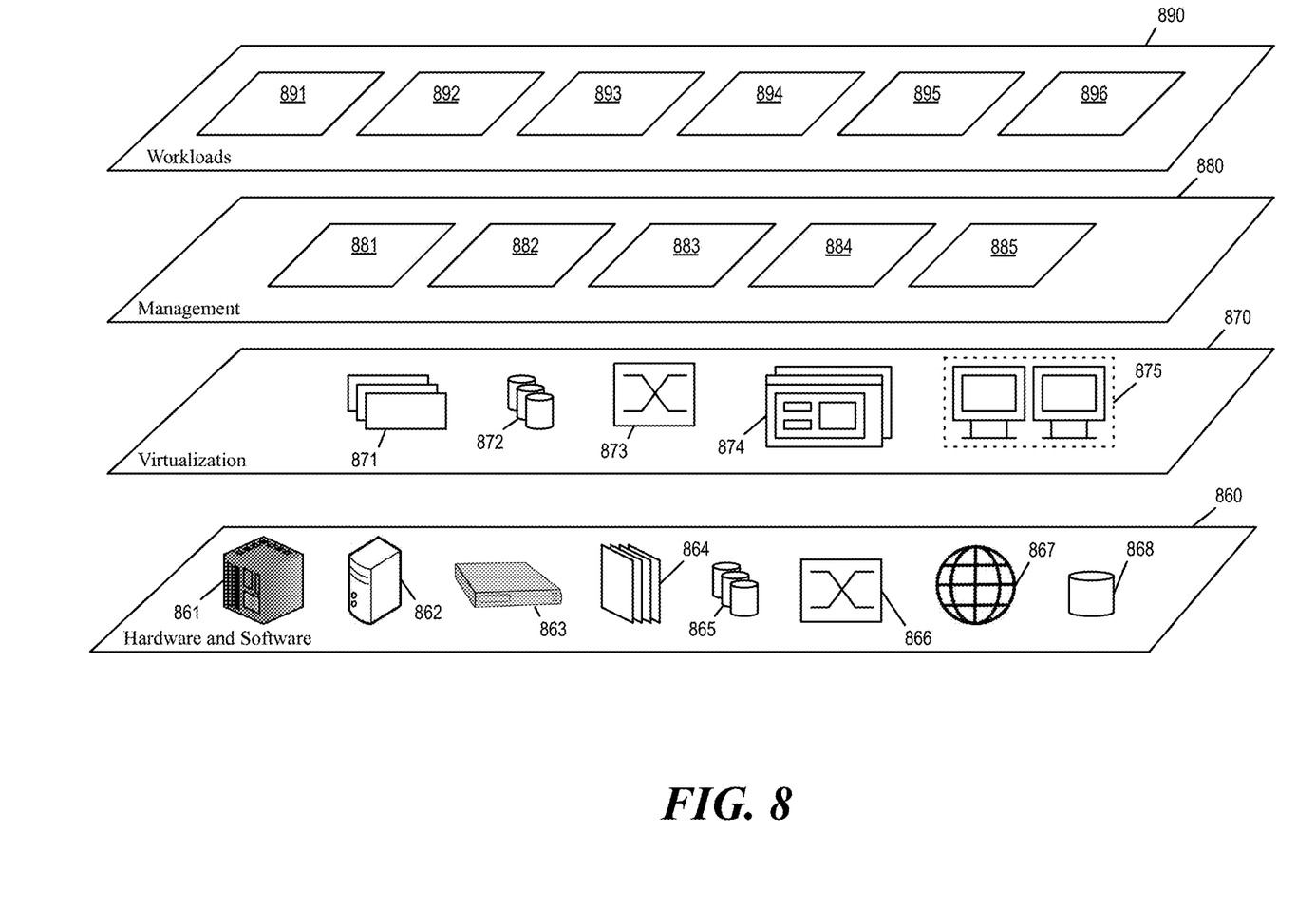
FIG. 8 illustrates a set of functional abstraction layers provided by a cloud-computing environment, consistent with an illustrative embodiment.

Referring now to FIG. 8, a set of functional abstraction layers provided by cloud computing environment 750 (of FIG. 7) is shown. It should be understood that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud-computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and workload 896. In some embodiments, the workload 896 performs some of the operations of the ML assessment system 100, e.g., recommending an ML modeling algorithm and a data collection mechanism based on RAE ratings.

The foregoing one or more embodiments implements an ML assessment system within a computer infrastructure by having one or more computing devices comparing profiles of a client with profiles of ML modeling algorithms and training datasets. The computer infrastructure is further used to compute RAE ratings for different ML solutions based on costs of data collection mechanisms and performance metrics of ML modeling algorithms.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
   a processor; and
   a storage device storing a set of instructions, wherein an execution of the set of instructions by the processor configures the computing device to perform acts comprising:
   identifying a plurality of datasets and a plurality of machine learning (ML) modeling algorithms based on a client profile;
   assessing a cost of data collection for each dataset of the plurality of datasets;
   assessing a performance metric for each ML modeling algorithm of the plurality of ML modeling algorithms; and
   recommending a dataset from the plurality of datasets and an ML modeling algorithm from the plurality of ML modeling algorithms based on the assessed cost of data collection for each of the plurality of datasets and the assessed performance metrics for the plurality of ML modeling algorithms, wherein recommending the dataset comprises comparing resource allocation efficiency ratings of different ML modeling algorithms stored in a reference library and identifying an ML modeling algorithm having a highest resource allocation efficiency rating.

2. The computing device of claim 1, wherein identifying the plurality of datasets based on the client profile comprises assessing a similarity between profiles of the datasets and the client profile.

3. The computing device of claim 1, wherein recommending the dataset comprises determining a resource allocation efficiency rating based on the assessed cost of the data collection of the recommended dataset and the assessed performance metric of the recommended ML modeling algorithm.

4. The computing device of claim 3, wherein the resource allocation efficiency rating is computed based on a metric that is mapped from the performance metric of the recommended ML modeling algorithm according to the client profile.

5. The computing device of claim 3, wherein the resource allocation efficiency rating is based on monetary return-on-investment.

6. The computing device of claim 1, wherein the performance metric of an ML modeling algorithm is assessed based on a dataset that is identified by a reference library as being associated with the ML modeling algorithm.

7. A computer-implemented method comprising:
   identifying a plurality of datasets and a plurality of machine learning (ML) modeling algorithms based on a client profile;
   assessing a cost of data collection for each dataset of the plurality of datasets;
   assessing a performance metric for each ML modeling algorithm of the plurality of ML modeling algorithms; and
   recommending a dataset from the plurality of datasets and an ML modeling algorithm from the plurality of ML modeling algorithms based on the assessed costs of data collection for the plurality of datasets and the assessed performance metrics for the plurality of ML modeling algorithms, wherein recommending the dataset comprises comparing resource allocation efficiency ratings of different ML modeling algorithms stored in a reference library and identifying an ML modeling algorithm having a highest resource allocation efficiency rating.

8. The computer-implemented method of claim 7, wherein identifying the plurality of datasets based on the client profile comprises assessing a similarity between profiles of the datasets and the client profile.

9. The computer-implemented method of claim 7, wherein recommending the dataset comprises determining a resource allocation efficiency rating based on the assessed cost of the data collection of the recommended dataset and the assessed performance metric of the recommended ML modeling algorithm.

10. The computer-implemented method of claim 9, wherein the resource allocation efficiency rating is computed based on an efficiency metric that is mapped from the performance metric of the recommended ML modeling algorithm according to the client profile.

11. The computer-implemented method of claim 9, wherein the resource allocation efficiency rating is based on monetary return-on-investment.

12. The computer-implemented method of claim 7, wherein the performance metric of an ML modeling algorithm is assessed based on a dataset that is identified by a reference library as being associated with the ML modeling algorithm.

13. A computer program product comprising:
   one or more non-transitory computer-readable storage devices and program instructions stored on at least one of the one or more non-transitory storage devices, the program instructions executable by a processor, the program instructions comprising sets of instructions for:

identifying a plurality of datasets and a plurality of machine learning (ML) modeling algorithms based on a client profile;

assessing a cost of data collection for each dataset of the plurality of datasets;

assessing a performance metric for each ML modeling algorithm of the plurality of ML modeling algorithms; and recommending a dataset from the plurality of datasets and an ML modeling algorithm from the plurality of ML modeling algorithms based on the assessed costs of data collection for the plurality of datasets and the assessed performance metrics for the plurality of ML modeling algorithms, wherein recommending the dataset comprises comparing resource allocation efficiency ratings of different ML modeling algorithms stored in a reference library and identifying an ML modeling algorithm having a highest resource allocation efficiency rating.

14. The computer program product of claim 13, wherein identifying the plurality of datasets based on the client profile comprises assessing a similarity between profiles of the datasets and the client profile.

15. The computer program product of claim 13, wherein recommending the dataset comprises determining a resource allocation efficiency rating based on the assessed cost of the data collection of the recommended dataset and the assessed performance metric of the recommended ML modeling algorithm.

16. The computer program product of claim 15, wherein the resource allocation efficiency rating is computed based on an efficiency metric that is mapped from the performance metric of the recommended ML modeling algorithm according to the client profile.

17. The computer program product of claim 13, wherein the performance metric of an ML modeling algorithm is assessed based on a dataset that is identified by a reference library as being associated with the ML modeling algorithm.

* * * * *